Figure 2:
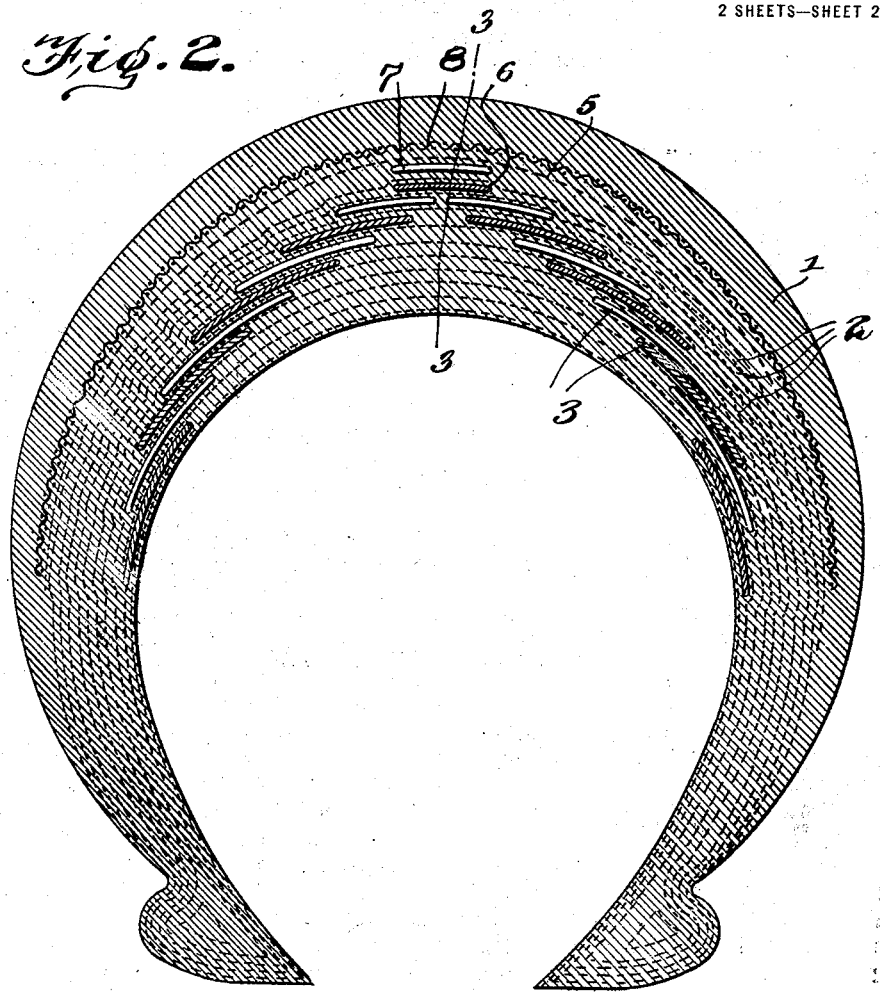

C. A. JOHNSON.
PNEUMATIC TIRE.
APPLICATION FILED JULY 11, 1916.
1,244,337.
Patented Oct. 23, 1917.
2 SHEETS—SHEET 1.
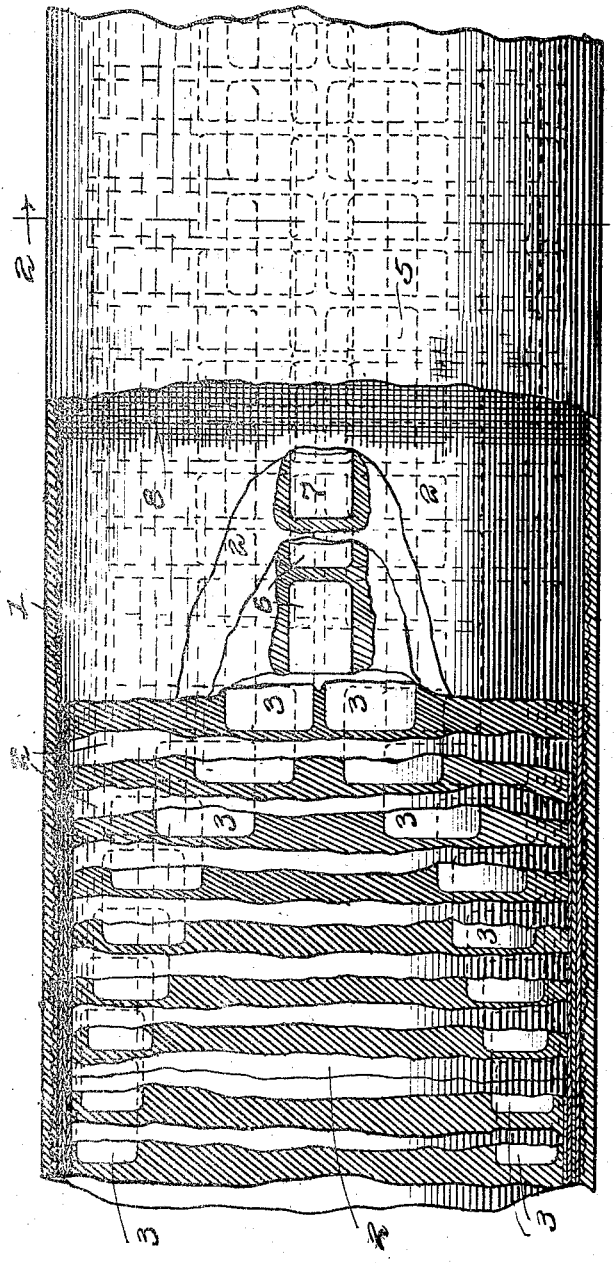
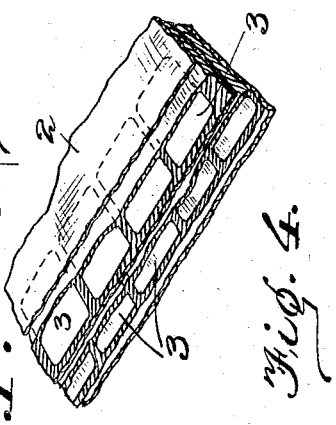
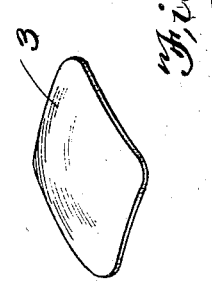
Inventor
C. A. Johnson
By Victor J. Evans
Attorney
Witness
H. H. Lybrand

C. A. JOHNSON.
PNEUMATIC TIRE.
APPLICATION FILED JULY 11, 1916.

1,244,337.

Patented Oct. 23, 1917.
2 SHEETS—SHEET 2.

Witness
N. H. Lybrand

Inventor
C. A. Johnson
By Victor J. Evans
Attorney

UNITED STATES PATENT OFFICE.

CHARLES A. JOHNSON, OF WAYCROSS, GEORGIA.

PNEUMATIC TIRE.

1,244,337.  Specification of Letters Patent.  Patented Oct. 23, 1917.

Application filed July 11, 1916. Serial No. 108,640.

*To all whom it may concern:*

Be it known that I, CHARLES A. JOHNSON, a citizen of the United States, residing at Waycross, in the county of Ware and State of Georgia, have invented new and useful Improvements in Pneumatic Tires, of which the following is a specification.

This invention relates to improvements in the construction of pneumatic tires.

In carrying out my invention it is my purpose to produce a pneumatic tire having embedded therein superimposed overlapping metal plates arranged in series whereby one of said series will bridge the joints between the plates of the other series and also whereby the tire will be rendered puncture proof.

It is a further object of the invention to embed in the vulcanized tubular body of the tire proper a series of fabric sheets arranged in tubiform one disposed over the other, to provide each of said sheets with a series of spring plates arranged longitudinally thereon, the plates being so disposed upon the sheets whereby the plates upon the outer sheets will successively overlie the inner series from the sides to the top or bearing surface of the tire, and further whereby each of the series of plates will be disposed to bridge the meeting edges of the adjacent or opposing series of plates, and wherein the said plates will add to the resiliency of the tire as well as armor or render the said tire puncture proof.

With the above and other objects in view the improvement resides in the construction, combination and arrangement of parts set forth in the following specification and falling within the scope of the appended claim.

Figure 3:
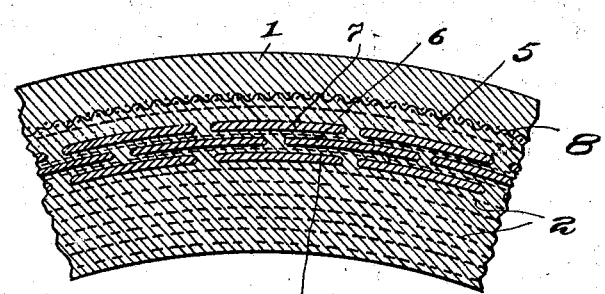

In the drawings:

Figure 1 is a top plan view of a portion of a tire constructed in accordance with the present invention, parts being broken away and parts being shown in section, Fig. 2 is a transverse sectional view of the same taken approximately on the line 2—2 of Fig. 1, Fig. 3 is a longitudinal section taken approximately on the line 3—3 of Fig. 2, Fig. 4 is a detail perspective view illustrating the manner in which the metallic plates are arranged upon the fabric sheets and embedded in the vulcanized tire, and Fig. 5 is a perspective view of one of the plates.

Like numerals designate corresponding parts in all of the figures of the drawings.

In the accompanying drawings in which is illustrated the preferred embodiment of the invention, 1 designates the tubular automobile tire, consisting of a unitary structure and having the form of an ordinary pneumatic tire and adapted to be constructed to fit the various patterns of wheel rims.

The tire 1 is of the ordinary vulcanized rubber construction and during the process of manufacture or vulcanizing the same I arrange therein a series of fabric sheets 2 which may be of any desired number and which, of course, are arranged in tubi-form and follow the general contour of the vulcanized tubular body 1. These fabric sheets 2 are disposed one over the other and are each of an equal thickness. The innermost sheet 2, at the sides thereof, has arranged thereon a series of substantially rectangular spring metal plates 3 which have all of their corners rounded so as not to cut the fabric sheet or the rubber tire. The next fabric sheet, disposed upon the first referred to sheet has also arranged thereon a series of similar plates 3 arranged longitudinally thereof and disposed to overlap the first referred to series of plates for approximately three-fourths of the length of the said first series and the last mentioned series of plates are also disposed to bridge the meeting edges of the first mentioned series of plates. The next and succeeding fabric sheets are provided with similar plates disposed to overlie the adjacent inner series of plates and to bridge the joint between the meeting edges of the said series of plates. The outer fabric sheet, indicated for distinction by the numeral 5, has its central portion, or the portion thereof disposed in a line with the tread or wearing surface of the tire 1 provided with one series of plates, indicated for distinction by the numerals 6, and these plates 6 are arranged centrally of the two series of plates disposed upon the sheet covered by the last mentioned sheet 5, the said plates 6 bridging the meeting edges of the referred to inner series of plates, as is clearly illustrated by the accompanying drawings, and disposed over the series of plates 6 and bridging the joint between the said plates are additional plates 7.

By this construction it will be noted that the tire is gradually increased in thickness from its sides provided with the innermost series of plates to its outer or bearing surface and the arrangement of the plates is such as to effectively armor the tire to render the same puncture proof while the said arrangement will not interfere with the pneumatic features of the tire but will rather, through their resiliency lend to the flexibility of the tire.

As an additional means for protecting the tire I embed within the same a reticulated band 8, the edges of which being disposed opposite the first series of plates. This band 8 may be in the nature of a wire mesh, as illustrated by the drawings, and is, of course, bent to conform with the cross sectional contour of the tire and, as stated, overlies all of the series of plates. This reticulated band 8 provides a protective armor so that the tire will not lose its effectiveness should the same contact with sharp surfaces which might cut or otherwise indent the tread surface of the tire and will prevent the said sharp obstacles contacting with the plates to injure the latter.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

A pneumatic tire comprising a body of flexible material and having embedded therein a series of fabric sheets arranged in tubi-form, one disposed over the other, each of said sheets, except the outer sheets, having arranged thereon two series of metallic plates so disposed that the plates of one of the series will lap the plates of the adjacent series for approximately one-half the width of the said plates, and whereby the series of plates of the respective sheets will be gradually arranged nearer the center of the tire, from the inner to the outer sheet, the remaining sheets having an endless series of metallic plates at the center portion thereof disposed in bridging relation with each other, and the inner series of the last referred to plates bridging the outermost plates arranged in pairs, and a reinforcing element embedded in the tire and surrounding all of the plates.

In testimony whereof I affix my signature.

CHARLES A. JOHNSON.